Figures 1, 2:
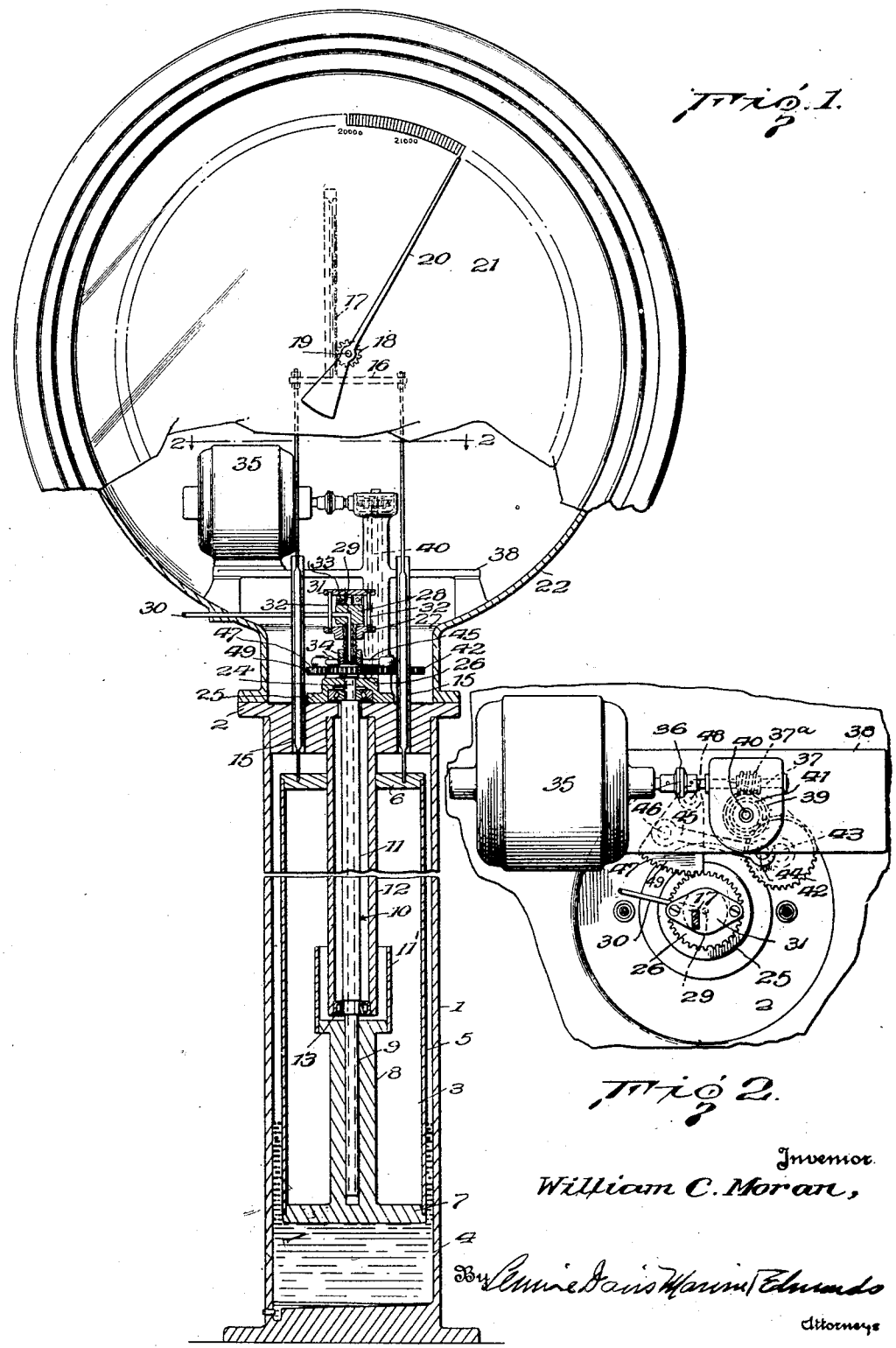

Jan. 12, 1932. W. C. MORAN 1,841,044
PRESSURE GAUGE
Filed March 20, 1931

Inventor
William C. Moran,
Attorneys

Patented Jan. 12, 1932

1,841,044

UNITED STATES PATENT OFFICE

WILLIAM C. MORAN, OF LAUREL SPRINGS, NEW JERSEY, ASSIGNOR TO RIEHLE BROS. TESTING MACHINE COMPANY, OF PHILADELPHIA, PENNSYLVANIA, A CORPORATION OF PENNSYLVANIA

PRESSURE GAUGE

Application filed March 20, 1931. Serial No. 524,156.

This invention comprises a device for indicating fluid pressure.

In testing machines in particular it is highly desirable to have a device which will accurately indicate high fluid pressures. The usual fluid pressure gauges such as the Bourdon gauge, the bellows type gauge and the manometer type of gauge have proved generally unsatisfactory for high pressures, and it is for this purpose that the gauge of the applicant is especially designed.

This gauge comprises a float adapted to float in a narrow well partially filled with mercury. The well is narrow enough in comparison with the float so that the float displaces a relatively large part of the mercury upon immersion and causes considerable change in the level of the mercury upon movement up or down. Thus when the float is pressed downward the level of the mercury rises rapidly upward and a short distance traveled by the float makes a relatively great change in the distance which the float is submerged in the mercury and hence in the amount of upward thrust which the float receives from the mercury. The float is adapted to be actuated by the pressure of the fluid and in turn the float actuates a pointer and dial mechanism which indicates the position of the float and thus the pressure of the liquid. The dial may be calibrated in pressure units or it may be calibrated in whatever units correspond to the force applied by the machine in connection with which it is used.

One of the particular features of the applicant's device is the means by which fluid pressure operates the float. In the inside of the float near the lower end and in the center thereof is a vertical column which may be cast integral with the bottom part of the float. This column is accurately bored to receive a vertical tube which extends through the top of the float and through a cap which forms the top of the mercury well. The tube is accurately machined as is the column in the float so that the tube slides into the column in the float, but substantially no leakage is possible between them. The liquid under pressure is supplied through the tube and exerts a pressure upon the bottom of the boring in the column tending to force the float down into the mercury in the well.

The tube is provided with thrust bearings and means for oscillating it back and forth. This oscillation prevents any sticking between the tube and column and causes the float to be practically free from the effect of any friction between the tube and column which might prevent the float from coming to true equilibrium.

It will thus be seen that the pressure is applied to the float in such a manner as to eliminate all possible sources of friction which would prevent the float from coming to the proper position and the float is so proportioned with respect to the mercury well that the slightest motion causes a relatively large change in the pressure which the mercury exerts on the float and thus tends to cause the float to assume a very accurate setting with as little movement thereof as possible. The fact that the mercury must flow as the float moves prevents sudden movement of the float and thus acts as a shock absorber to prevent sudden changes from reaching the indicating mechanism.

For a detailed illustration of this device reference may be had to the accompanying drawings in which Fig. 1 is a front view partly in section of a preferred embodiment of this device and Fig. 2 is a detail view taken from above, of the means for oscillating the tube which supplies the pressure to the float, and is a partial section of Figure 1 taken on the line 2—2.

In the drawings, the mercury well 1 which is preferably cylindrical in form, also forms the base of the device. The upper end of the mercury well 1 is provided with a cap 2 which is securely fastened to and covers the well. Inside the well a float 3, formed of a carefully machined cylinder 5 and having cast ends 6 and 7, floats in mercury 4. The bottom end 7 has integrally cast therewith a central column 8 which extends upwardly into the center of the inside of the float and is bored accurately to receive the end section 9 of the tube 10. At the upper end of the column 8 a cylindrical flange 11' prevents any liquid which may leak out between the tube 10 and the column 8 from getting down into the bottom of the float. The float 3 may be weighted with lead but this is not shown. The tube 10 has above the section 9, a section 11 of somewhat greater diameter and the section 11 is surrounded by a stationary tube 12 rigidly secured to the cap 2 and extending down to the smaller end section 9 of the tube 10. The tube 12 carries at its lower end the bearings 13 in which the tube 10 is journalled so that the tube 12 forms a support to steady the tube 10.

The top 6 of the float 3 has formed therein an opening which surrounds the tubes 10 and 12 and has connected thereto the members 15 which extend upwardly through the cap 2 and support at their upper ends a cross bar 16 which, in turn, supports a rack 17 which operates a pinion 18 on a shaft 19 carrying a pointer 20. The pointer 20 is adapted to indicate upon the dial face 21 the position of the float and hence the pressure. The dial and pointer parts are supported from a frame 22 which rests upon the cap 2 and encloses the upper parts of the mechanism.

At its upper end the tube 10 has another smaller section 24 and at the shoulder formed between the smaller section 24 and the larger section 11, a roller bearing adapted to take up both thrust and radial motion is located. A casting 25 holds this bearing in accurate alignment and in position against the cap 2. A gear 26 keyed to the tube 11 serves as a means through which the tube may be oscillated.

The upper end of the section 24 above the gear 26 is threaded and lock nuts 34 for holding gear 26 in place and a collar 27 threaded thereon. Lying against the upper end of the tube 10 is block 28 which carries a tube 29 and a tube 30. The tube 30 supplies the fluid from the source of pressure and is connected through an opening in the block 28 to the tube 29 which extends for a short distance down into the inside of the tube 10. The tube 29 and the inside of the tube 10 are so machined that they fit too closely to allow any substantial leakage. A plate 31 lies above the block 29 and is fastened through bolts 32 to the collar 27 screwed on to the end of the tube 10. Roller bearings 33 between the plate 31 and the block 28 hold the block 28 in position against the end of the tube 10 but allow the block 28 to remain stationary while the tube 10 is oscillated.

The mechanism which oscillates the tube 10 through the gear 26 is shown more plainly in Fig. 2, which is a partial section taken on line 2—2 of Fig. 1. A frame 38 is mounted inside the frame 22 and forms a support for the electric motor 35. This frame 38 is so formed as to provide bearings for supporting a shaft 37 driven from the motor through a flexible coupling 36, and carrying a worm gear 37a. A vertical shaft 40 is also journalled in bearings in the frame 38 and carries a gear 39 fast to its upper end and meshing with the worm gear 37a. At the lower end of shaft 40 is fixed a gear 41, through which a gear 42 is driven. The gear 42 is mounted upon the upper end of a stud shaft 43 supported in the cap 2 and is free to rotate upon this shaft. This gear 42 carries an eccentrically located pin 44, to which is attached a link 45 connected at its other end to a pin 46 on a gear segment 47. The segment 47 is rotatably mounted upon a shaft 48 supported from the cap 2, and is adapted to be oscillated through the link 45. The segment 47 meshes with and oscillates the gear 26 and thereby the tube 10.

In operation the motor 35 through its mechanism constantly oscillates the tube 10 and the variations in pressure coming in through tube 30 cause a variation in the pressure exerted against the bottom of the float 3 and hence cause a change in the level at which the float 3 floats in the mercury well 1. Any movement of the float 3 moves the members 15, the cross member 16 and the rack 17 to change the position of the pointer.

It will be apparent that this device is described only in one embodiment but it is obvious that changes in design within the scope of the general idea herein disclosed are also within the scope of this invention as set out in the appended claims.

What I claim is:

1. A pressure gauge comprising a float chamber containing liquid, a hollow float in said chamber, means for bringing fluid the pressure of which is to be measured, to bear against said float to submerge it, said means comprising a vertical column inside said float formed integral with the bottom thereof, a vertically extending tube having a carefully machined lower end, said column being bored to receive said lower end slidably, means to support said tube firmly in position, means to oscillate said tube about its axis, means to supply the fluid, the pressure of which is to be tested, to the upper end of said tube, and means for indicating the position of said float.

2. A pressure gauge comprising a float chamber containing liquid, a hollow float in said chamber, means for bringing fluid the pressure of which is to be measured, to bear against said float to submerge it, said means comprising a vertical column inside said float formed integral with the bottom thereof, a vertically extending tube having a carefully machined lower end, said column being bored to receive said lower end slidably, means to support said tube firmly in position, means to oscillate said tube about its axis, means to supply the fluid, the pressure of which is to be tested, to the upper end of said tube, comprising a non-oscillatable block at the upper end of said tube, means for holding said block in position at the end of said tube, a small tube rigidly fixed to said block and extending downwardly into said first mentioned tube, said tubes being machined to fit slidably but close enough to prevent substantial leakage, and a third tube connected to said small tube through said block for supplying the pressure to be tested thereto, and means for indicating the position of said float.

3. A pressure gauge comprising a float chamber containing liquid, a hollow float in said chamber, means for bringing fluid the pressure of which is to be measured to bear against said float to submerge it, said means comprising a vertically extending tube having a carefully machined lower end, said float being bored to receive said lower end slidably, means to support said tube firmly in position, means to oscillate said tube about its axis, means to supply the fluid, the pressure of which is to be tested to the upper end of said tube, and means for indicating the position of said float.

4. A pressure gauge comprising a float chamber containing liquid, a float in said chamber having a vertically extending recess, means for bringing fluid, the pressure of which is to be measured, to bear against the bottom of the recess in said float to submerge it, said means having a fluid-tight connection with said recess, and means to measure the degree of submersion of said float.

5. A pressure gauge comprising a float chamber containing liquid, a float in said chamber having a vertically extending recess, means for bringing fluid, the pressure of which is to be measured, to bear against said float to submerge it, said means comprising a tube extending downwardly into said recess, said tube having a sufficiently close fit with said recess to normally prevent escape of the fluid from the recess, and means to measure the degree of submersion of said float.

6. A pressure gauge comprising a float chamber containing liquid, a float in said chamber having a vertically extending recess, means for bringing fluid, the pressure of which is to be measured, to bear against said float to submerge it, said means comprising a tube extending downwardly into said recess, said tube having a sufficiently close fit with said recess to normally prevent escape of the fluid from the recess, means to turn said tube about its longitudinal axis within the recess, and means to measure the degree of submersion of said float.

7. A pressure gauge comprising a float chamber containing liquid, a float in said chamber having a vertically extending recess, means for bringing fluid, the pressure of which is to be measured, to bear against said float to submerge it, said means comprising a tube extending downwardly into said recess, said tube having a sufficiently close fit with said recess to normally prevent escape of the fluid from the recess, means to oscillate said tube within said recess, and means to measure the degree of submersion of said float.

8. A pressure gauge comprising a float chamber containing liquid, a float in said chamber having a vertically extending recess, means for bringing fluid, the pressure of which is to be measured, to bear against said float to submerge it, said means comprising a tube extending downwardly into said recess, said tube having a sufficiently close fit with said recess to normally prevent escape of the fluid from the recess, a rigid tube surrounding and contacting said vertical tube whereby the said vertical tube is steadied, and means to measure the degree of submersion of said float.

9. A pressure gauge comprising a float chamber containing liquid, a float in said chamber having a vertically extending recess, means for bringing fluid, the pressure of which is to be measured, to bear against said float to submerge it, said means comprising a tube extending downwardly into said recess, said tube having a sufficiently close fit with said recess to normally prevent escape of the fluid from the recess, a rigid tube surrounding and steadying a part of said vertical tube and bearings between said tubes, and means to measure the degree of submersion of said float.

10. A pressure gauge comprising a float chamber containing fluid, a float in said chamber having a vertically extending recess, means for bringing fluid, the pressure of which is to be measured, to bear against said float to submerge it, said means comprising a tube extending downwardly into said recess, said tube having a sufficiently close fit with said recess to normally prevent escape of the fluid from the recess, a rigid tube surrounding and steadying a part of said vertical tube extending from above said float chamber and float downwardly into said float chamber and float, antifriction bearings between said tubes, and means to measure the degree of submersion of said float.

11. A pressure gauge comprising a float chamber containing liquid, a float in said chamber having a vertically extending recess, means for bringing fluid, the pressure of which is to be measured, to bear against said float to submerge it, said means comprising a tube extending downwardly into said recess, said tube having a sufficiently close fit with said recess to normally prevent escape of the fluid from the recess, gearing to oscillate said tube within said recess, and means to measure the degree of submersion of said float.

12. A pressure gauge comprising a float chamber containing fluid, a float in said chamber having a vertically extending recess, means for bringing fluid, the pressure of which is to be measured, to bear against said float to submerge it, said means comprising a tube extending downwardly into said recess, said tube having a sufficiently close fit with said recess to normally prevent escape of the fluid from the recess, means to oscillate said tube comprising a gear fixed to said tube, a segmental gear meshing with said first-mentioned gear, a third gear, a link eccentrically connected to said third gear and said segmental gear for oscillating said segmental gear and means to drive said third gear, and means to measure the degree of submersion of said float.

13. A pressure gauge comprising a float chamber containing liquid, a float in said chamber having a vertically extending recess, means for bringing fluid, the pressure of which is to be measured, to bear against said float to submerge it, said means comprising a tube extending downwardly into said recess, said tube having a sufficiently close fit with said recess to normally prevent escape of the fluid from the recess, a rigid tube surrounding and steadying a part of said vertical tube extending from above said float chamber and float downwardly into said float chamber and float, roller bearings between said vertical tube at the lower end and said rigid surrounding tube, a bearing near the upper end of said first-mentioned tube for receiving both upward and radial thrusts, and means to measure the degree of submersion of said float.

In testimony whereof I affix my signature.

WILLIAM C. MORAN.